US006596240B2

(12) United States Patent
Taggart et al.

(10) Patent No.: US 6,596,240 B2
(45) Date of Patent: Jul. 22, 2003

(54) PIPETTE TIP FOR EASY MOUNTING AND EJECTING FROM A PIPETTE

(75) Inventors: Thomas Taggart, Rohnert Park, CA (US); Howard Keith Spencer, Angwin, CA (US); Peter Paul Blaszcak, Sebastopol, CA (US)

(73) Assignee: Porex Corporation, Fairburn, GA (US)

( * ) Notice: Subject to any disclaimer, the term of this patent is extended or adjusted under 35 U.S.C. 154(b) by 204 days.

(21) Appl. No.: 09/758,430

(22) Filed: Jan. 12, 2001

(65) Prior Publication Data

US 2002/0094302 A1 Jul. 18, 2002

(51) Int. Cl.[7] .................................................. B01L 3/02
(52) U.S. Cl. ...................... 422/100; 422/99; 73/864.01
(58) Field of Search .................. 422/99, 100; 73/864.01

(56) References Cited

U.S. PATENT DOCUMENTS

| | | | |
|---|---|---|---|
| 3,732,734 A | 5/1973 | Avakian | 73/425.6 |
| 4,072,330 A | 2/1978 | Brysch | 285/239 |
| 4,187,724 A | 2/1980 | Citrin | 73/425 |
| D255,601 S | 6/1980 | De Vaughn | D24/55 |
| D256,052 S | 7/1980 | De Vaughn | D24/55 |
| D274,651 S | 7/1984 | De Vaughn | D24/55 |
| 4,487,081 A | 12/1984 | De Vaughn et al. | 73/864.13 |
| D286,570 S | 11/1986 | Williams | D24/55 |
| 4,679,446 A | 7/1987 | Sheehan et al. | 73/864 |
| 4,707,337 A | 11/1987 | Jeffs et al. | 422/100 |
| D297,054 S | 8/1988 | Williams | D24/55 |
| 4,824,641 A | 4/1989 | Williams | 422/100 |
| 4,917,274 A | 4/1990 | Asa et al. | 222/420 |
| 4,961,350 A | 10/1990 | Tennstedt | 73/864 |
| 4,999,164 A | 3/1991 | Puchinger et al. | 422/100 |
| 5,032,343 A | 7/1991 | Jeffs et al. | 264/320 |
| 5,200,151 A | 4/1993 | Long | 422/100 |
| 5,232,669 A | 8/1993 | Pardinas | 422/100 |
| 5,496,523 A | 3/1996 | Gazit et al. | 422/100 |
| 5,556,598 A | 9/1996 | Raybuck et al. | 422/10 |
| D384,418 S | 9/1997 | Torti et al. | D24/222 |
| 5,779,984 A | 7/1998 | Kelly et al. | 422/104 |
| 5,807,524 A | 9/1998 | Kelly et al. | 422/100 |
| 5,833,927 A | 11/1998 | Raybuck et al. | 422/101 |
| 5,851,491 A | 12/1998 | Moulton | 422/101 |
| D414,562 S | 9/1999 | Tajima | D24/222 |
| D416,625 S | 11/1999 | Torti et al. | D24/222 |
| 6,045,757 A | 4/2000 | Moriarty et al. | 422/100 |
| 6,066,297 A | 5/2000 | Torti et al. | 422/100 |
| 6,117,394 A | 9/2000 | Smith | 422/100 |

FOREIGN PATENT DOCUMENTS

| | | |
|---|---|---|
| EP | 0 148 333 A1 | 7/1985 |
| EP | 0 733404 A1 | 9/1996 |
| EP | 0 743 095 A1 | 11/1996 |
| GB | 2 172 218 A | 9/1986 |
| WO | WO 90/14162 | 11/1990 |
| WO | WO 91/16975 | 11/1991 |
| WO | WO 00/27528 | 5/2000 |
| WO | WO 0027529 | 5/2000 |
| WO | WO 0027530 | 5/2000 |

OTHER PUBLICATIONS

New ProGard Filter Tips; Cole–Parmer Instrument Company, Niles, Illinois; 1995–96 catalog; pp. 270–271.
Fisherbrand Pipet Tips; Fisher Scientific Company LLC, Pittsburgh, PA; 1993–94 catalog; pp. 1242–1243.

Primary Examiner—Jan Ludlow
(74) Attorney, Agent, or Firm—Pennie & Edmonds LLP

(57) ABSTRACT

A pipette tip member having an elongated tubular receptacle with a protrusion on an inner surface of the receptacle, and a recess on the inner surface adjacent the protrusion. The tip member has a generally conical shape and the protrusion extends around the inner surface to form an annular sealing ring. The protrusion has a V-shaped axial cross section with edges that intersect at an angle between about 30° and about 120°. The recess has a generally circular axial cross section and the recess is disposed proximal to the protrusion in the axial direction. The recess depth is about as great as the protrusion height. A method of forming a pipette tip member is also disclosed.

19 Claims, 4 Drawing Sheets

PIPETTE TIP FOR EASY MOUNTING AND EJECTING FROM A PIPETTE

BACKGROUND OF THE INVENTION

Pipettes and pipette tips come in many configurations. Seals between the pipette and the tip can be formed in several different ways: two conical surfaces coming together, raised rings forming annular pressure points, and a blunt corner or radiused corner forced into a conical tip. To insure a good seal, a technical must insert the pipette into the pipette tip with enough force to affect a seal by displacing plastic in the tip. In some instances this can be considerable.

One solution is proposed in U.S. Pat. No. 4,748,859 to Magnussen, Jr., et al. A disposable pipette tip member is disclosed having three inner coaxial annular sealing bands spaced axially from an open proximal end for receiving a conical pipette tip mounting shaft. The first two sealing bands are relatively resilient and simultaneously engage, guide and laterally support the pipette shaft as it enters the tip member to form annular fluid-tight seals with the shaft. The third band is relatively rigid and upon engagement with the shaft, forms a third annular fluid-tight seal and a controllable stop for the shaft such that the tip member is seated on the shaft adjacent the pipette tip ejector mechanism.

Removal of the tip can be difficult as well, and over many uses during a day, can cause fatigue and even injury over time. A need exists for a method for producing a pipette tip that can be inserted and ejected with a minimal force, maintain a good seal, and provide for a good fit on a variety of pipettes.

Also, a need exists for a method of forming relatively large and resilient rings on the internal sealing surface of the pipette tip. Typically, the size of an internal ring is limited since it is "undercut" in the mold that forms the tip. In order to remove the part from the mold, it must expand for the ring to be released from the groove on the mold core that forms it. This limits its size, and can "smear" the ring as it is removed.

SUMMARY OF THE INVENTION

The present invention is directed to a pipette tip member for releasably mating with a pipette shaft. The tip member comprises an elongated tubular receptacle having a central axis, a protrusion on an inner surface of the receptacle, and a recess on the inner surface adjacent the protrusion. The tip member can have a generally conical shape and the inner surface is tapered from a rear opening at a proximal end to a tip opening at a distal end.

In one embodiment the protrusion extends around the inner surface to form an annular sealing ring and the recess extends around the inner surface to form an annular groove.

The protrusion preferably has a V-shaped axial cross section. In one embodiment the protrusion has first and second generally straight edges that intersect at an angle between about 30° and about 120°, preferably between about 45° and about 90°. In another embodiment, the first and second edges intersect at an angle of about 60°.

The recess preferably has a generally circular axial cross section and at least a portion of the recess is collinear with at least a portion of the protrusion. In one embodiment the tip member extends from a rear opening at a proximal end to a tip opening at a distal end and the recess is disposed proximal to the protrusion in the axial direction.

In one embodiment the recess extends radially outward from the inner surface and has a depth and the protrusion extends radially inward from the inner surface and has a height and the recess depth is about as great as the protrusion height. In another embodiment the recess depth is greater than the protrusion height.

The present invention is also directed to a method of forming a tubular pipette tip member, comprising the steps of: providing a mold including a mold core with a conical shape and including a mold protrusion disposed adjacent and proximal to a mold recess, introducing mold material into the mold; and removing the mold material by forcing the mold material off of the mold core. In one embodiment, during the step of removing the mold material, the mold material is forced radially outward by the mold protrusion and the tip protrusion is lifted radially outward from the mold recess. In yet another embodiment, during the step of removing the mold material, the tip protrusion is spaced from the mold core after tip protrusion is lifted out of the mold recess.

DETAILED DESCRIPTION OF THE PREFERRED EMBODIMENTS

Figure 1:
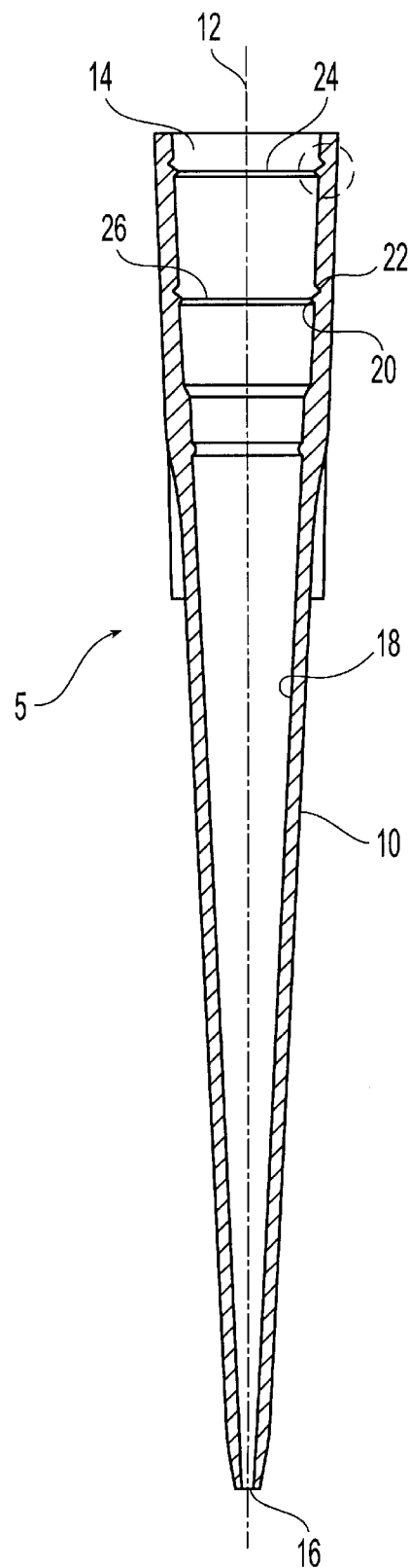
FIG. 1 is a cross-section view of a pipette tip member in accordance with the present invention.

In FIG. 1, a preferred pipette tip member 5 comprises an elongated tubular receptacle 10 extending along axis 12 having a rear or proximal opening 14 at a proximal end for axially receiving a distal end of a pipette shaft and a tip opening 16 at a distal end for dispensing fluid from the tip member. Receptacle 10 is generally conical in shape having an inner surface 18 that tapers or narrows from the proximal opening 14 to the tip opening 16. Tip member 5 is preferably formed of a plastic material, such as polypropylene.

Figure 2:
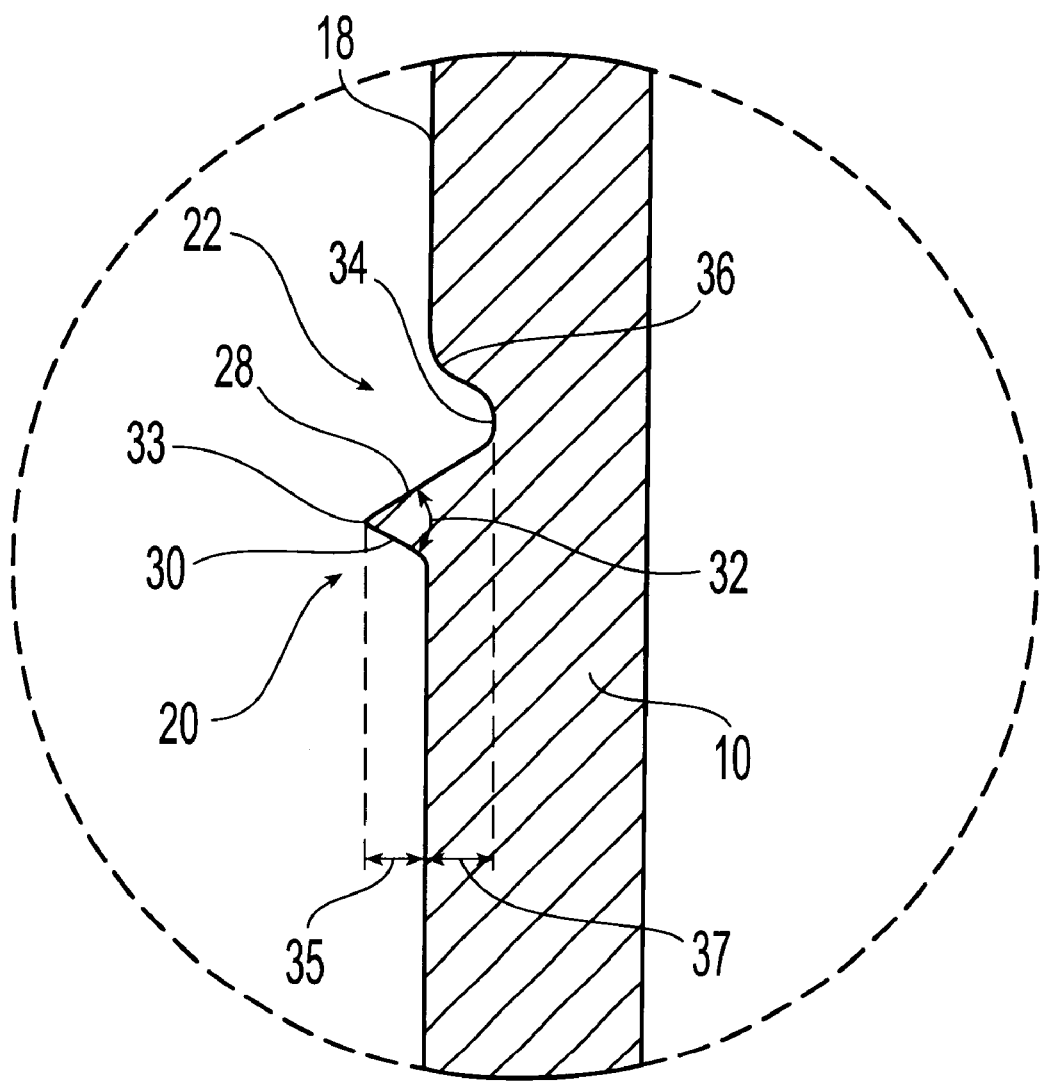
FIG. 2 is an enlarged axial fragmentary sectional view of the tip member of FIG. 1.

The inner surface 18 of receptacle 10, as best seen in FIG. 2, includes at least one protrusion 20 adjacent recess 22. Preferably, receptacle 10 includes two protrusions 20 and two recesses 22, however more protrusions and recesses may be provided as desired. In the preferred embodiment, protrusions 20 extend around the inner surface 18 to form annular sealing rings 24 and 26 coaxial with the receptacle. Sealing rings 24 and 26 are axially separated along axis 12 of receptacle 10. Recesses 22 preferably extend around the inner surface 18 to form annular grooves adjacent sealing rings 24 and 26.

As best seen in FIG. 2, the protrusions 20 have a V-shaped axial cross-section and are made of the plastic material forming the receptacle. Protrusion 20 includes a proximal edge 28 and a distal edge 30 which intersect at an angle 32 at the apex 33. Angle 32 is preferably between about 30° and 120°, more preferably between about 45° and 90°, most preferably about 60°. Protrusion 20 extends radially inward from the inner surface and has a height 35 defined by the distance from inner surface 18 to apex 33 in the radial direction. In alternate embodiments, protrusions 20 may have axial cross-sections of other shapes, such as circular, parabolic, elliptical, polygonal or the like. In embodiments that include more than one protrusion 20, the protrusions preferably have the same cross-sectional shape, however the protrusions can have differing shapes.

The recesses 22 have a rounded inner surface 34 and form a generally circular axial cross-section. Recess 22 extends radially outward from the inner surface and has a depth 37 defined by the distance from inner surface 18 to the point of the inner surface furthest therefrom in the radial direction. The rounded inner surface 34 gradually transitions to inner surface 18 at rounded corner 36 along the proximal side of recess 22. The proximal edge 28 of protrusion 20 preferably merges into the distal side of recess 22. In the preferred embodiment, the distal side of recess 22 and the proximal side of protrusion 20 are at least partially collinear. In alternate embodiments, recess 22 can be spaced from the protrusion 20.

Inner surface 18 preferably has a uniform axial taper and receptacle 10 preferably has substantially uniform wall thickness in the axial direction and generally provides consistent lateral flexibility and resilience. In the preferred embodiment, the height 35 of protrusion 20 and the depth 37 of recess 22 are substantially the same. In alternate embodiments, the depth 37 of recess 22 is greater than the height 35 of protrusion 20.

Figures 3, 4, 5:
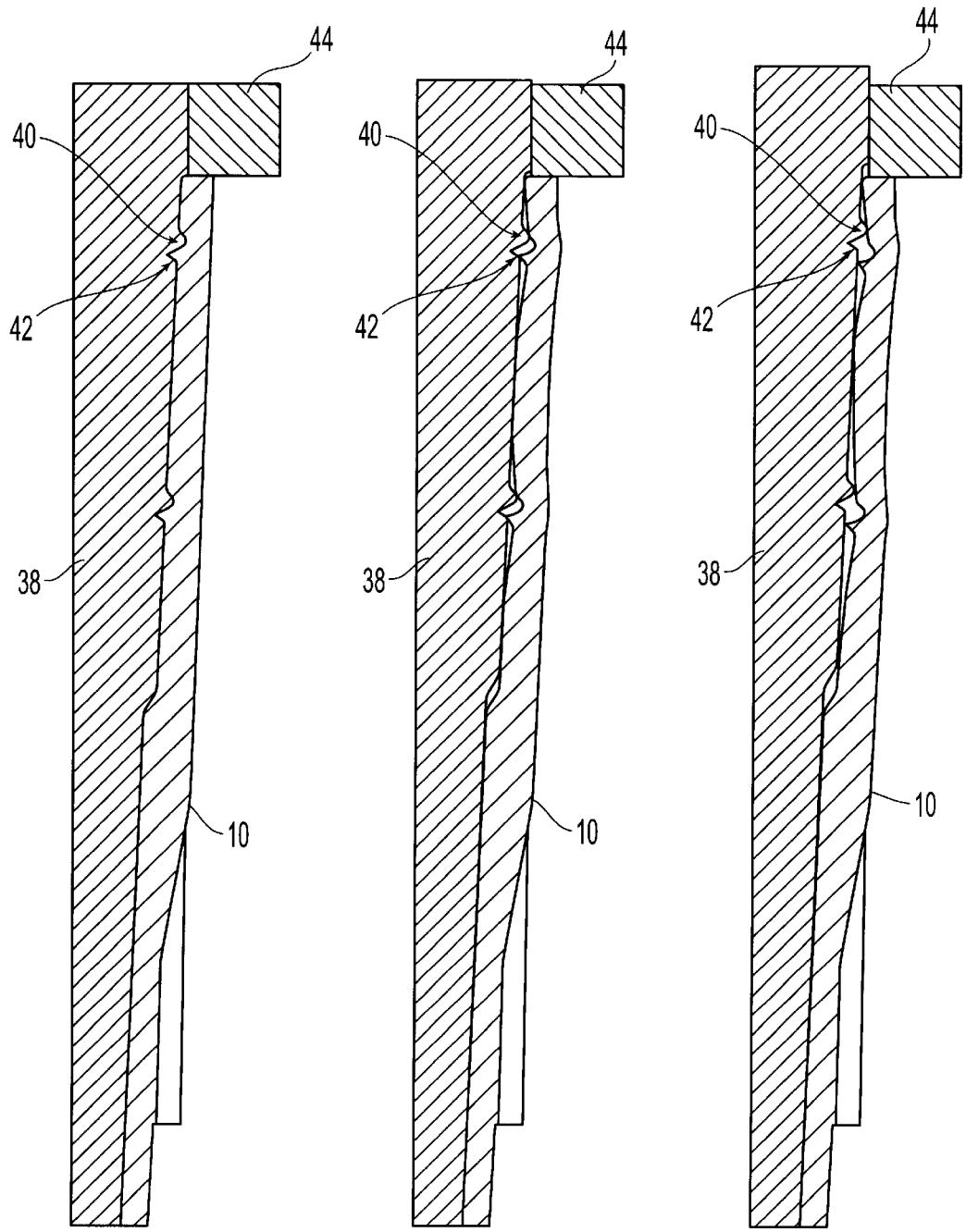
FIGS. 3–5 are enlarged cross-sectional views of the tip member of FIG. 1 formed around a mold body showing a mold removal sequence.

Tip member 5 is formed by molding, either injection molding or otherwise, between a mold core 38 and an outer mold shell (not shown). As can be seen in FIG. 3, mold core 38 has a mold protrusion 40 corresponding to recess 22 of tip member 5 and a mold recess 42 corresponding to protrusion 20. Protrusion 40 and recess 42 of mold core 38 have a geometry substantially mirroring the shape and size of the recess 22 and protrusion 20 of tip member 5, respectively. Preferably mold material is introduced around core 38 in a liquified state and flows into mold recess 42 and around mold protrusion 40 to form the protrusion 20 and recess 22 of the tip member 5. When the mold material solidifies, the mold shell is removed and tip member 5 is removed from the mold.

During the demolding sequence, shown in FIGS. 3–5, tip member 5 is removed or stripped from core 38 by a stripper member 44. Preferably, stripper member 44 has a ring shape and is disposed coaxial with mold core 38 at the proximal end of tip member 5. Stripper member 44 is advanced from the proximal end of tip member 5 in the distal direction or toward the tip of member 5 and forces or moves the tip member in the distal direction off of core 38. As seen in FIG. 4, when tip member 5 is stripped off of core 38, the recess 22 is moved off of mold protrusion 40 and "cams" or lifts the adjacent protrusion 20 out of the corresponding mold recess 42. In this way, protrusion 20 of tip member 5 is preferably first moved radially outward from mold recess 42 before the tip member 5 is moved in the distal direction. Also, as tip member 5 moves along core 38 during the demolding sequence, protrusion 20 is held outwardly from the core by the mold protrusion 40. Accordingly, protrusion 20 of tip member 5, is less likely to be smeared or cut by the mold core 38 and damage to protrusion 20 is minimized during the demolding sequence. Such a configuration advantageously allows relatively large or high protrusions extending a greater distance radially inward from the inner surface of the tip member and thus allows relatively large or high sealing rings to be molded on the interior of tip member 5 which in turn can enhance the seal that can be maintained between a pipette and the pipette tip member 5 during operation.

Figure 6:
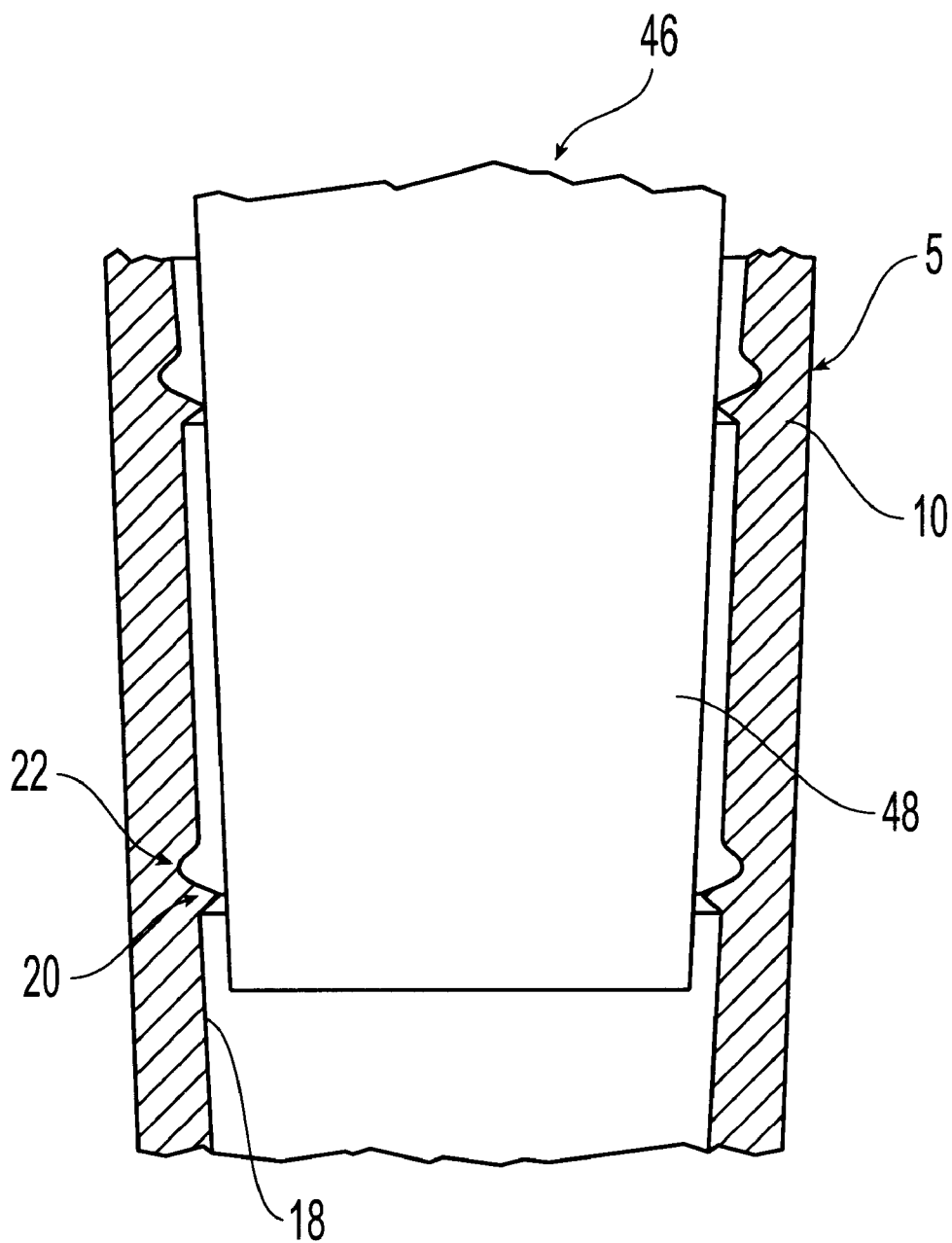
FIG. 6 is an enlarged cross-sectional view of the tip member of FIG. 1 receiving a distal end of a pipette shaft.

Referring now to FIG. 6, a pipette 46 is received in proximal opening 14 of tip member 5. Pipette 46 has a conical shaped shaft or distal end 48. By providing relatively large or high sealing rings, the resulting tip member will easily and smoothly receive the pipette 46 and the force required to form a fluid tight annular seal with the pipette is preferably minimized. When the pipette 46 is withdrawn or removed from tip member 5 it is also easily and smoothly released from the sealing rings such that the withdrawal force required is preferably minimized to alleviate the aforementioned dismounting problems commonly associated with pipettes.

More particularly, in the preferred form of the tip member 5, the geometric dimensions of the protrusion 20 and sealing rings 24 and 26 provide increased flexibility as a higher protrusion or a protrusion extending a greater distance radially inward from the inner surface of the tip member may bend, deform, or provide a greater degree of forgiveness than a smaller or shorter protrusion. Because of the flexibility and resilience of the protrusions 20 and sealing rings 24 and 26, as the shaft 48 of the pipette 46 moves into the receptacle 10 and engages the sealing rings 24 and 26, the rings bend in the distal direction and flatten slightly to easily create a fluid tight seal. Also, because of the amount of forgiveness in the fit between the sealing rings 24 and 26 and the pipette, a wide variety of pipettes can be accommodated.

One of ordinary skill in the art can envision numerous variations and modifications to the invention disclosed herein. All of these modifications are contemplated by the true spirit and scope of the following claims.

What is claimed is:

1. A pipette tip member for releasably mating with a pipette shaft, comprising:
   an elongated tubular receptacle having a central axis;
   a protrusion on an inner surface of the receptacle; and
   a recess on the inner surface adjacent the protrusion
   wherein the tip member extends from a rear opening at a proximal end to a tip opening at a distal end and the recess is disposed immediately adjacent and proximal to the protrusion in the axial direction, and
   wherein the protrusion has a V-shaped axial cross section with first and second straight edges that intersect at an angle between about 30° and about 120°.

2. The tip member of claim 1, wherein the receptacle has a generally conical shape and the inner surface is tapered from a rear opening at a proximal end to a tip opening at a distal end.

3. The tip member of claim 1, wherein the protrusion extends around the inner surface to form an annular sealing ring.

4. The tip member of claim 1, wherein the recess extends around the inner surface to form an annular groove.

5. The tip member of claim 1, wherein the first and second edges intersect at an angle of about 60°.

6. The tip member of claim 1, wherein the recess has a generally circular axial cross section.

7. The tip member of claim 6, wherein at least a portion of the recess is collinear with at least a portion of the protrusion.

8. The tip member of claim 1, wherein the recess extends radially outward from the inner surface and has a depth defined by the distance from the inner surface to the point of the recess furthest therefrom in the radial direction,
   and the protrusion extends radially inward from the inner surface and has a height defined by the distance from the inner surface to the point of the protrusion furthest therefrom in the radial direction,
   wherein the recess depth is about as great as the protrusion height.

9. The tip member of claim 8, wherein the recess depth is greater than the protrusion height.

10. A pipette tip member for releasably mating with a pipette shaft, comprising:

an elongated tubular receptacle having a central axis;

a protrusion on an inner surface of the receptacle; and a recess on the inner surface adjacent the protrusion wherein the recess extends radially outward from the inner surface and has a depth defined by the distance from the inner surface to the point of the recess furthest therefrom in the radial direction, and the protrusion extends radially inward from the inner surface and has a height defined by the distance from the inner surface to the point of the protrusion furthest therefrom in the radial direction, wherein the recess is immediately adjacent the protrusion and the recess depth is greater than the protrusion height.

11. The tip member of claim 10, wherein the receptacle has a generally conical shape and the inner surface is tapered from a rear opening at a proximal end to a tip opening at a distal end.

12. The tip member of claim 10, wherein the protrusion extends around the inner surface to form an annular sealing ring.

13. The tip member of claim 10, wherein the recess extends around the inner surface to form an annular groove.

14. The tip member of claim 10, wherein the protrusion has a V-shaped axial cross section.

15. The tip member of claim 14, wherein the protrusion has first and second generally straight edges that intersect at an angle between about 30° and about 120°.

16. The tip member of claim 15, wherein the first and second edges intersect at an angle of about 60°.

17. The tip member of claim 10, wherein the recess has a generally circular axial cross section.

18. The tip member of claim 17, wherein at least a portion of the recess is collinear with at least a portion of the protrusion.

19. The tip member of claim 10, wherein the tip member extends from a rear opening at a proximal end to a tip opening at a distal end and the recess is disposed proximal to the protrusion in the axial direction.

* * * * *